US012726326B2

(12) United States Patent
Lehmann et al.

(10) Patent No.: US 12,726,326 B2
(45) Date of Patent: Sep. 1, 2026

(54) TIME DIVISION DUPLEXING (TDD) SYNCHRONIZED COMPENSATION

(71) Applicant: Molex, LLC, Lisle, IL (US)

(72) Inventors: Lars Lehmann, Wildau (DE); Helmut Kautge, Stahnsdorf (DE); Ahmed Sayed, Berlin (DE)

(73) Assignee: Molex, LLC, Lisle, IL (US)

( * ) Notice: Subject to any disclaimer, the term of this patent is extended or adjusted under 35 U.S.C. 154(b) by 427 days.

(21) Appl. No.: 18/368,019

(22) Filed: Sep. 14, 2023

(65) Prior Publication Data

US 2024/0097871 A1 Mar. 21, 2024

Related U.S. Application Data

(60) Provisional application No. 63/407,168, filed on Sep. 16, 2022.

(51) Int. Cl.
*H04L 5/14* (2006.01)
*H04W 56/00* (2009.01)

(52) U.S. Cl.
CPC ......... *H04L 5/1469* (2013.01); *H04W 56/002* (2013.01)

(58) Field of Classification Search
CPC .. H04L 5/1469; H04W 56/002; H04B 1/3822; H04B 1/3877; H04B 1/48
See application file for complete search history.

(56) References Cited

U.S. PATENT DOCUMENTS

| | | | | |
|---|---|---|---|---|
| 10,536,184 | B2 | 1/2020 | Nast et al. | |
| 2015/0163036 | A1* | 6/2015 | Thomas | H04W 72/23 370/281 |
| 2017/0094679 | A1 | 3/2017 | Lupescu | |
| 2018/0227856 | A1* | 8/2018 | Yang | H04W 52/0274 |
| 2020/0383075 | A1 | 12/2020 | Ashworth | |
| 2020/0395973 | A1 | 12/2020 | Nast et al. | |
| 2021/0105028 | A1* | 4/2021 | Kautge | H04B 1/006 |
| 2021/0409105 | A1 | 12/2021 | Ashworth et al. | |

(Continued)

FOREIGN PATENT DOCUMENTS

| | | | | |
|---|---|---|---|---|
| EP | 3707834 | B1 | 12/2021 | |
| WO | WO-2017151173 | A1 * | 9/2017 | H04L 5/1469 |

(Continued)

*Primary Examiner* — Ashley Shivers

(57) ABSTRACT

Disclosed are exemplary methods and devices (e.g., circuits, compensators, low-gain signal boosters, repeaters, signal amplifier devices, etc.) for providing time division duplexing synchronized compensation between a terminal device (e.g., mobile phone, user equipment within a vehicle, a coupling antenna on a wireless charger, etc.) and an antenna (e.g., a vehicle roof antenna, etc.) or antenna connection, etc. In an exemplary embodiment, a circuit includes at least one detector, at least one control unit, at least one uplink path including at least one transmission amplifier, and at least one downlink path including at least one reception amplifier. The uplink and downlink paths are configured to be operable for respectively amplifying uplink and downlink signals having a same frequency according to time division duplexing. The control unit is configured to be operable for activating the uplink path and deactivating the downlink path before an uplink signal is transmitted by a terminal device.

23 Claims, 10 Drawing Sheets

(56) References Cited

U.S. PATENT DOCUMENTS

2022/0263526 A1* 8/2022 Kautge ................ H04B 1/0057
2023/0088283 A1* 3/2023 Lee ..................... H04W 56/001
370/503
2024/0072989 A1* 2/2024 Zhang ................... H04L 5/0092

FOREIGN PATENT DOCUMENTS

WO WO-2020199062 A1 * 10/2020 ............... H04B 1/44
WO 2020254311 A1 12/2020

* cited by examiner

| Configuration | 3GPP release | Downlink to uplink switch point periodicity (ms) | Subframe number | | | | | | | | | | Number of subframes / frame | | |
|---|---|---|---|---|---|---|---|---|---|---|---|---|---|---|---|
| | | | 0 | 1 | 2 | 3 | 4 | 5 | 6 | 7 | 8 | 9 | D [DL] | U [UL] | S [SSF] |
| 0 | 8 | 5 | D | S | U | U | U | D | S | U | U | U | 2 | 6 | 2 |
| 1 | 8 | 5 | D | S | U | U | D | D | S | U | U | D | 4 | 4 | 2 |
| 2 | 8 | 5 | D | S | U | D | D | D | S | U | D | D | 6 | 2 | 2 |
| 3 | 8 | 10 | D | S | U | U | U | D | D | D | D | D | 6 | 3 | 1 |
| 4 | 8 | 10 | D | S | U | U | D | D | D | D | D | D | 7 | 2 | 1 |
| 5 | 8 | 10 | D | S | U | D | D | D | D | D | D | D | 8 | 1 | 1 |
| 6 | 8 | 5 | D | S | U | U | U | D | S | U | U | D | 3 | 5 | 2 |

FIG. 3

TIME DIVISION DUPLEXING (TDD) SYNCHRONIZED COMPENSATION

RELATED APPLICATION

This application claims priority to U.S. Provisional Patent Application Ser. No. 63/407,168 filed Sep. 16, 2022, which is incorporated herein by reference in its entirety.

TECHNICAL FIELD

This disclosure generally relates to time division duplexing (TDD) synchronized compensation.

DESCRIPTION OF RELATED ART

In a modern vehicle, it can be expected that radio frequency (RF) signals will be sent and/or received from the vehicle. Whether it is an operator's and/or passenger's personal mobile device or a system in the vehicle that is intended to communicate with the outside world, RF signals will need to be emitted and/or received. As can be appreciated, however, the design of a vehicle is poorly suited to transmit RF signals as the substantial use of metal acts to attenuate the signal substantially.

To account for the attenuation, a compensator or signal amplifier device (e.g., a Molex Compenser™ signal amplifier device, etc.) can be provided to eliminate signal loss inside the vehicle. For example, and as shown in FIG. 1, a compensator may be used to amplify RF signals from a mobile phone or other user equipment (UE) within a vehicle. Or, for example, a compensator may be used to amplify RF signals between a terminal device (e.g., a coupling antenna on a wireless charger, etc.) and an antenna (e.g., a vehicle roof antenna, etc.).

Frequency Division Duplexing (FDD) and Time Division Duplexing (TDD) are different techniques used in modern communications for signal transmission. For FDD, both uplink and downlink signals with different frequencies can be transmitted simultaneously through a combined filter called a duplexer. For TDD, both uplink and downlink signals have the same frequency such that the transmission process can only be established by switching between both signals periodically.

For example, FIG. 2 illustrates a circuit arrangement 400 configured for amplifying an uplink signal 1 or a downlink signal 2. The circuit arrangement 400 includes detectors 6*a*, 6*b* to determine the signal direction. The circuit arrangement 400 is further described in U.S. Patent Application Publication US2020/0395973A, which is incorporated herein by reference in its entirety.

SUMMARY

This section provides a general summary of the disclosure and is not a comprehensive disclosure of its full scope or all of its features.

Exemplary embodiments are disclosed of methods and devices (e.g., circuits, compensators, low-gain signal boosters, repeaters, signal amplifier devices, etc.) for providing time division duplexing (TDD) synchronized compensation between a terminal device (e.g., mobile phone, user equipment within a vehicle, a coupling antenna on a wireless charger, etc.) and an antenna (e.g., a vehicle roof antenna, etc.) or antenna connection, etc. For example, exemplary embodiments may be configured for providing TDD New Radio (5 NR) synchronization for compensators, low-gain signal boosters, repeaters, signal amplifier devices, etc.

In an exemplary embodiment, a circuit includes at least one detector, at least one control unit, at least one uplink path including at least one transmission amplifier, and at least one downlink path including at least one reception amplifier. The uplink and downlink paths are configured to be operable for respectively amplifying uplink and downlink signals having a same frequency according to time division duplexing (TDD). The control unit is configured to be operable for activating the uplink path and deactivating the downlink path before an uplink signal is transmitted by a terminal device.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The present application is illustrated by way of example and not limited in the accompanying figures in which like reference numerals indicate similar elements and in which:

FIG. 3 illustrates an LTE TDD 36.211 radio frame structure type 2 in which D refers to a downlink (DL) subframe, U refers to an uplink (UL) subframe, and S refers to a special subframe (SSF).

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

As noted above in the background, Time Division Duplexing (TDD) is a signal transmission technique in which both uplink and downlink signals have the same frequency such that the transmission process can only be established by switching between both signals periodically. For TDD, a radio frame structure defines signal transmissions in both the uplink (UL) and downlink (DL) paths from the mobile phone and the base station, respectively. The location and number of DL and UL subframes (SF) may vary based on the used radio frame structure.

For example, FIG. 3 illustrates an LTE TDD 36.211 radio frame structure type 2 in which D refers to a downlink (DL) subframe, U refers to an uplink (UL) subframe, and S refers to a special subframe (SSF). The radio frame structure is defined in 7 definitions for uplink and downlink transmission. As a result of the downlink or uplink allocation in the radio frame structure, there is a downlink-uplink-switch period of 5 milliseconds (ms) or 10 ms between downlink to uplink.

Figure 4:
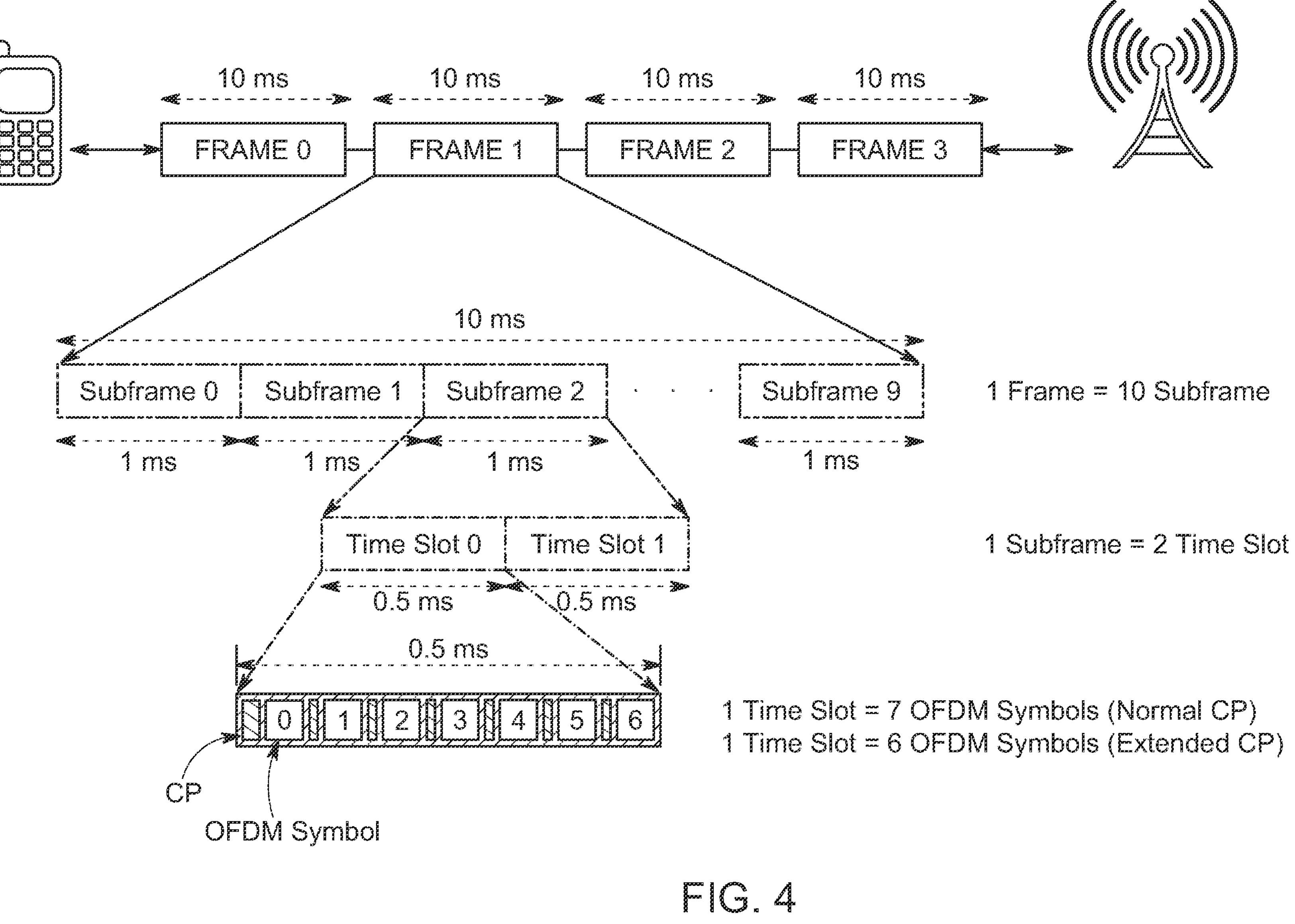
FIG. 4 is a diagram illustrating communications between a mobile phone and a base station.

FIG. 4 is a diagram illustrating communications between a mobile phone and a base station. The defined radio frames are continuously repeated. The radio frame is defined for a time of 10 ms. Each radio frame consists of 10 subframes. For LTE, the subframe consists of 14 OFDM (orthogonal frequency-division multiplexing) symbols for normal cyclic prefix (Normal CP). Stated differently, the subframe consists of two time slots (Time Slot 0 and Time Slot 1) each including 7 OFDM symbols for a total of 14 OFDM symbols for normal cyclic prefix. For extended cyclic prefix CP, the subframe consists of two time slots (Time Slot 0 and Time Slot 1) each including 6 OFDM symbols for a total of 12 OFDM symbol.

Orthogonal frequency-division multiplexing (OFDM) is a multi-carrier technology that generates a number of orthogonal subcarriers with small bandwidth. The bandwidth between the subcarriers is referred to as subcarrier spacing (SCS), which is fixed at 15 kilohertz (kHz) for LTE.

Figure 5:
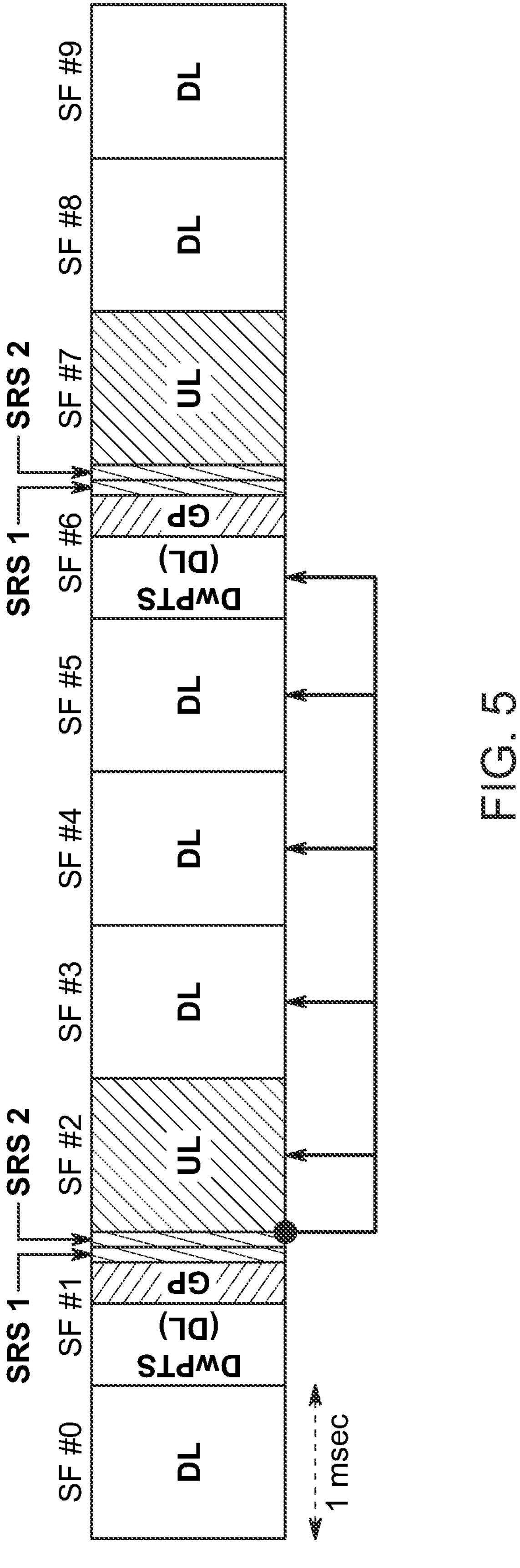
FIG. 5 illustrates an LTE radio frame structure with an uplink-downlink configuration of type 2.

FIG. 5 illustrates an LTE TDD radio frame structure with an uplink-downlink configuration of type 2. The radio frame structure defines the signal transmission in both uplink and downlink paths from the mobile phone and the base station, respectively. In the radio frame structure shown in FIG. 5, SF is subframe, UL is Uplink Signal, DL is Downlink Signal, GP is Guard Period, SRS is Sound Referencing Signal, DwPTS is Downlink Pilot Time Slot, and UwPTS is Uplink Pilot Time Slot.

Subframes SF #0, SF #3, SF #4, SF #5, SF #8, and SF #9 are only used for downlink (DL). Subframes SF #2 and SF #7 are only used for uplink (UL). Subframes SF #1 and SF #6 are special subframes that are divided into DwPTS (Downlink Pilot Time Slot), Guard Period (GP), and UwPTS (Uplink Pilot Time Slot). Each of the nine subframes uses a minimum of at least one OFDM symbol.

The guard period (GP) is a time during which no transmission between downlink and uplink takes place. The guard period is the optimal time to switch between downlink to uplink.

In the Uplink Pilot Time Slot (UwPTS), the uplink can partially (randomly) be preceded by sounding reference symbols (SRS). The SRS is used by the base station to estimate the quality of the uplink channel for large bandwidths outside the assigned span to a specific terminal device or user equipment (UE). The duration of the sounding reference symbols (SRS) and guard period (GP) depend on the length of the OFDM symbols and thus from the subcarrier spacing (SC S) used by the network.

The frame format that is used defines where a transmission for downlink or uplink may be allocated inside a radio frame. It is possible that a mobile phone (or other user equipment or terminal device) does not use or require the use of each slot for transmission. The allocation of uplink signals for data transmission or sounding reference symbols (SRS) is controlled by the base station, and the mobile phone uses the assigned resource blocks in frequency or time domain.

Figure 6:
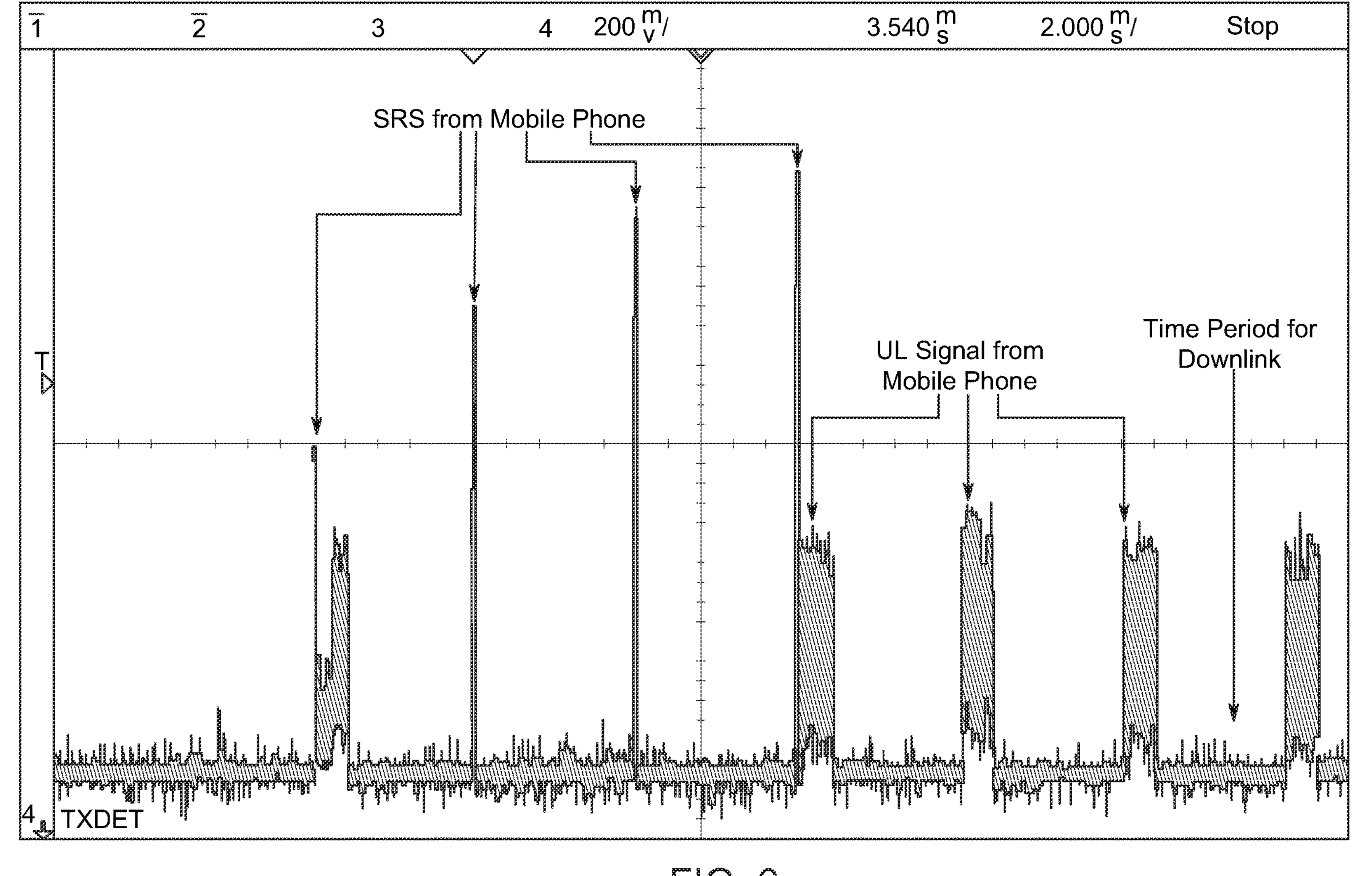
FIG. 6 illustrates exemplary measurement results from a practical field test of an uplink signal from a mobile phone over a time of several radio frames in 5G NR Band n78.

FIG. 6 illustrates exemplary measurement results from a practical field test of an uplink signal from a mobile phone over a time of several radio frames in 5G NR Band n78. The 5G NR Band n78 follows Time Division Duplexing (TDD) mode and has a frequency range from 3300 Megahertz (MHz) to 3800 megahertz (MHz) with a bandwidth of 500 MHz.

Figure 1:
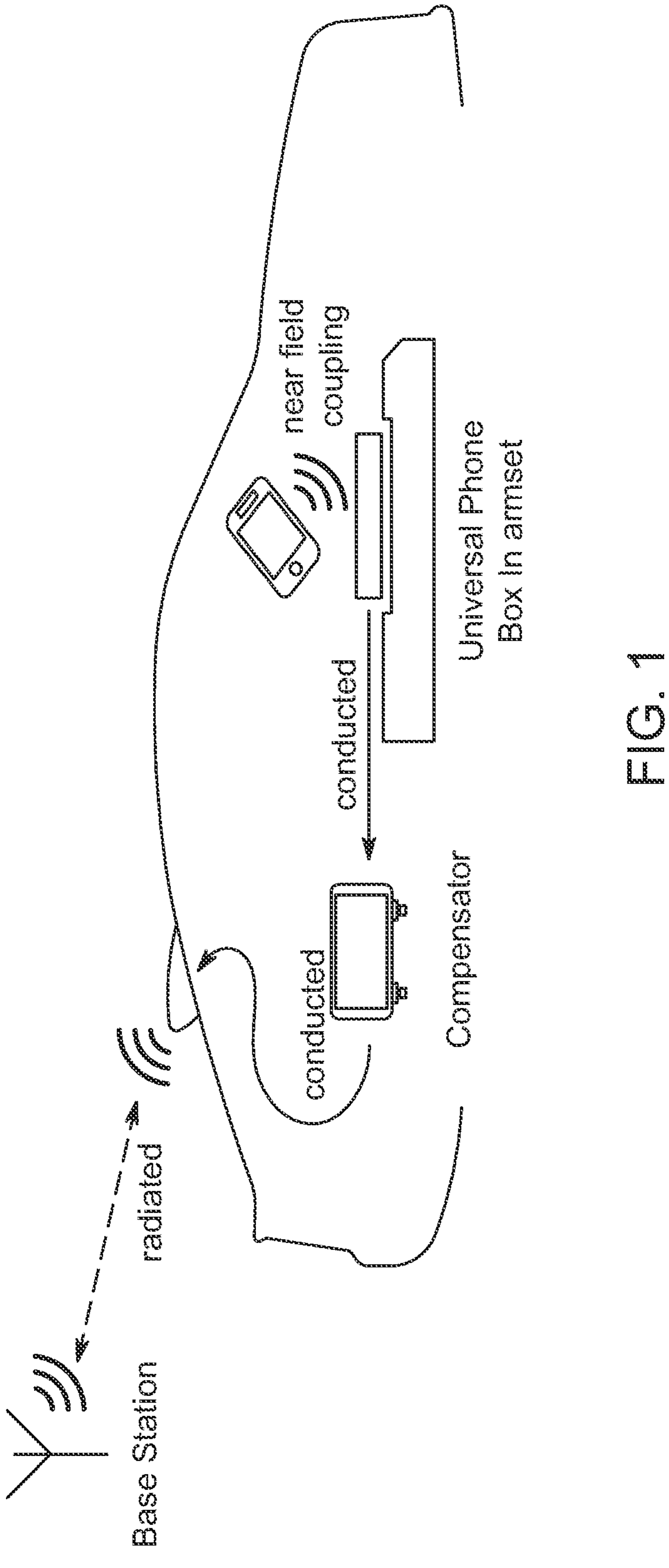
FIG. 1 illustrates a compensator or signal amplifier device (e.g., a Molex Compenser™ signal amplifier device, etc.) within a vehicle for amplifying RF signals from a mobile phone and/or between a terminal device (e.g., a coupling antenna on a wireless charger, etc.) and an antenna (e.g., a vehicle roof antenna, etc.) to eliminate signal loss inside the vehicle.
Figure 2:
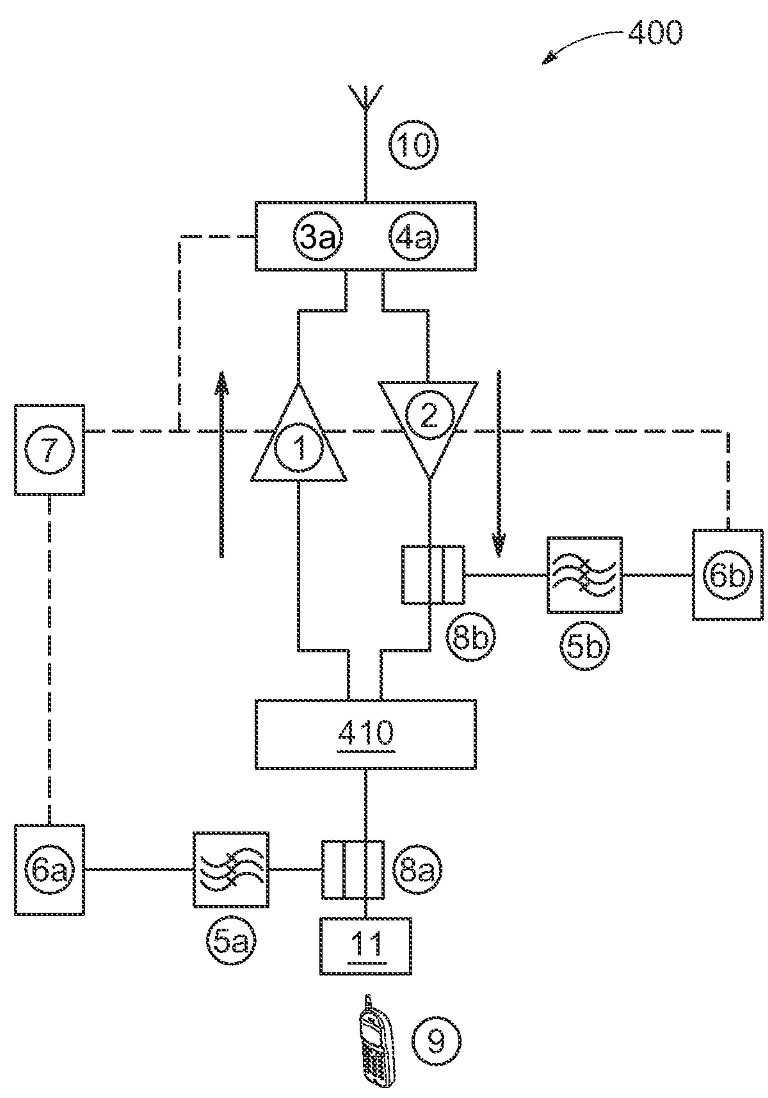
FIG. 2 is a block diagram of an example circuit arrangement that may be configured for providing time division duplexing (TDD) synchronized compensation according to an exemplary embodiment of the present disclosure.

By way of example, the measurement of the uplink signal may be taken from the transmission (TX) detector 6*a* shown in FIG. 2. For this example testing, the downlink-uplink-switching-period of the network was setup to 2.5 milliseconds (ms). For uplink signals, a duration of one slot 500 microseconds (μs) was measured. The measurement results shown in FIG. 6 reveal that the mobile phone does not transmit data or SRS symbols in every slot. And the transmission is random and dependent on the data throughput and the requested SRS symbols.

Figure 7:
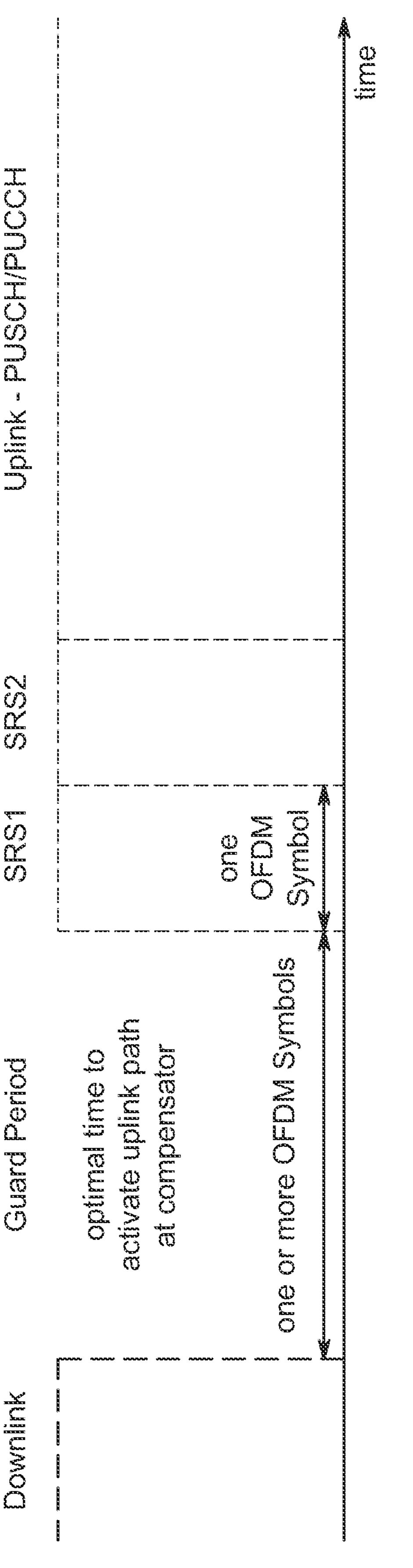
FIG. 7 is a detailed view of a portion (subframes SF #0, SF #1, and SF #2) of the LTE radio frame structure shown in FIG. 5.

FIG. 7 is a detailed view of a portion (subframes SF #0, SF #1, and SF #2) of the LTE TDD radio frame structure shown in FIG. 5. In FIG. 7, PUSCH refers to the Physical Uplink Shared Channel, and PUCCH refers to the Physical Uplink Control Channel. The Physical Uplink Shared Channel (PUSCH) carries user data. The Physical Uplink Control Channel (PUCCH) carries control information like: uplink control information (UCI), ACK/NACK information related to data packets received in the downlink, Channel quality indication (CQI), etc.

As shown in FIG. 7, the Guard Period is the optimal time to activate the uplink path at the compensator or signal amplifier device. Stated differently, the best time to activate the uplink path is after the downlink transmission and before a possible SRS1 is transmitted. The SRS1 has a duration of one OFDM symbol, and the Guard Period defines a time duration of one or more OFDM symbols. The duration of one OFDM symbol is dependent of the subcarrier spacing (SCS).

For LTE $4^{th}$ Mobile phone generation, the subcarrier spacing is defined and fixed at 15 kHz.

For NR (New Radio) $5^{th}$ Mobile phone generation, the subcarrier spacing is not fixed at 15 kHz only as other subcarrier spacings of 15 kHz, 30 kHz, or 60 kHz may be used. The duration of the OFDM Symbol is inverse to the subcarrier spacing. Accordingly, the OFDM symbol duration is 66.7 μs for 15 kHz subcarrier spacing, 33.3 μs for 30 kHz subcarrier spacing, and 16.7 μs for 60 kHz subcarrier spacing.

As recognized herein, the following challenges/problems are associated with the TDD technique. Uplink (UL) and downlink (DL) paths are not allowed to be activated at the same time to avoid oscillations. The UL path or DL path must be switched on relatively fast to avoid data losses thereby resulting in high data rates transmission. The UL path or DL path must be switched on before the UL signal or DL signal rises to avoid interferences and damages due to RF hot switching issues. By switching to the UL path, the sporadic SRS (Sounding Reference Symbols) must not be destroyed. In 5G New Radio (NR), the radio frame structure (subframes, subcarrier spacing, regions, etc.) is more flexible than in the earlier standards. The switching process only occurs in the guard periods, which must be determined (flexible). The UL and DL subframes can have transmission gaps (OFDM symbols). As further recognized herein, the compensator should therefore be configured to be operable for analyzing and synchronizing to flexible frame formats of LTE and New Radio (NR) TDD signals.

Current solutions do not guarantee that the switching takes place in the guard periods of 4G frame formats or 5G frame formats. With current solutions, transmission gaps can lead to switching off the paths, thereby resulting in data losses or interferences. The switching times are not adjusted (flexible) to 5G frame formats or to different frame formats, which can also lead to switching off data transmissions and thus data losses with current solutions. Furthermore, existing methods to predict the uplink signal do not consider SRS (Sounding Reference Symbols), which can lead to a wrong estimation of the channel quality by the network.

After recognizing the above, exemplary embodiments of methods and devices (e.g., circuits, compensators, low-gain signal boosters, repeaters, signal amplifier devices, etc.) were developed and/or disclosed herein for providing time division duplexing (TDD) synchronized compensation between a terminal device (e.g., mobile phone, user equipment within a vehicle, a coupling antenna on a wireless charger, etc.) and an antenna (e.g., a vehicle roof antenna, etc.) or antenna connection, etc. For example, exemplary embodiments may be configured for providing TDD New Radio (5 NR) synchronization for compensators, low-gain signal boosters, repeaters, signal amplifier devices, etc.

In exemplary embodiments disclosed herein, the radio frame structure (transmission period, duration, OFDM symbol length, etc.) is analyzed, e.g., by one or more RF detectors and a control unit (e.g., microcontroller, etc.), etc. After the analysis of the radio frame structure is complete, the radio frame structure does not change during the transmission process. Based on the analysis, the switching of uplink (UL) and downlink (DL) paths are synchronized to the radio frame structure. The DL path is deactivated, and the UL path is activated after the last downlink signal is received from the base station and before an uplink signal from the mobile phone is transmitted (within the guard period). Conversely, the UL path is deactivated, and the DL path is activated after the last uplink signal is transmitted by the mobile phone and before a downlink signal is received from the base station. The UL path is activated earlier so that SRS symbol(s) are also supported. If the radio frame structure is changed and thus the guard period is also changed, the switching time is adjusted if needed, e.g., by the circuit, etc.

Signal Detection

An example signal detection technique will be described with reference to FIG. 2 for purpose of illustration only, as other signal detection techniques (e.g., other circuit arrangements, etc.) may also be used. When an uplink signal in an LTE or NR TDD Band is detected by the detectors 6*a* and 6*b*, the downlink path is deactivated and the uplink path is activated by respectively switching off the downlink amplifier 2 and switching on the power amplifier 1 via RF switches 3*a*, 4*a*, 410. The uplink path will remain active so long as an uplink signal is detected by the TX detector 6*a*.

A detector (e.g., TX detector 6*a*, RX detected 6*b*, etc.) is a standard RF power detector circuit. The power detector circuit converts an RF signal into a DC voltage. The RF power could be, for example, in the range from about −40 dBm (decibel-milliwatts) to about +10 dBm. The frequency range of the detector may be, for example, from about 50 MHz to about 6000 MHz.

The DC voltage is digitized for further processing by a control unit (e.g., microcontroller, etc.) to analyze the signal power over time. This allows signal characteristics or parameters to be determined, such as signal strength or the time period of the UL slots. Typical time period cycles for NR and LTE are 10 ms, 5 ms, and 2.5 ms. Based on the signal characteristics or parameters, the signal paths are switched on and off in the UL direction or DL direction.

Prediction and Uplink Path Activation Before Uplink Signal is Transmitted

As disclosed herein, exemplary embodiments are uniquely configured to be operable such that the uplink path is activated before the uplink signal is transmitted by the mobile phone. In exemplary embodiments, the time period cycle of the uplink (UL) frames (e.g., FIG. 5, etc.) is analyzed by the detector(s) and control unit (e.g., TX detector 6*a* and control unit 7 shown in FIG. 2, etc.). This enables prediction of the beginning of the UL frames and thus pre-activation of the UL path before the uplink signal is transmitted.

Figure 8:
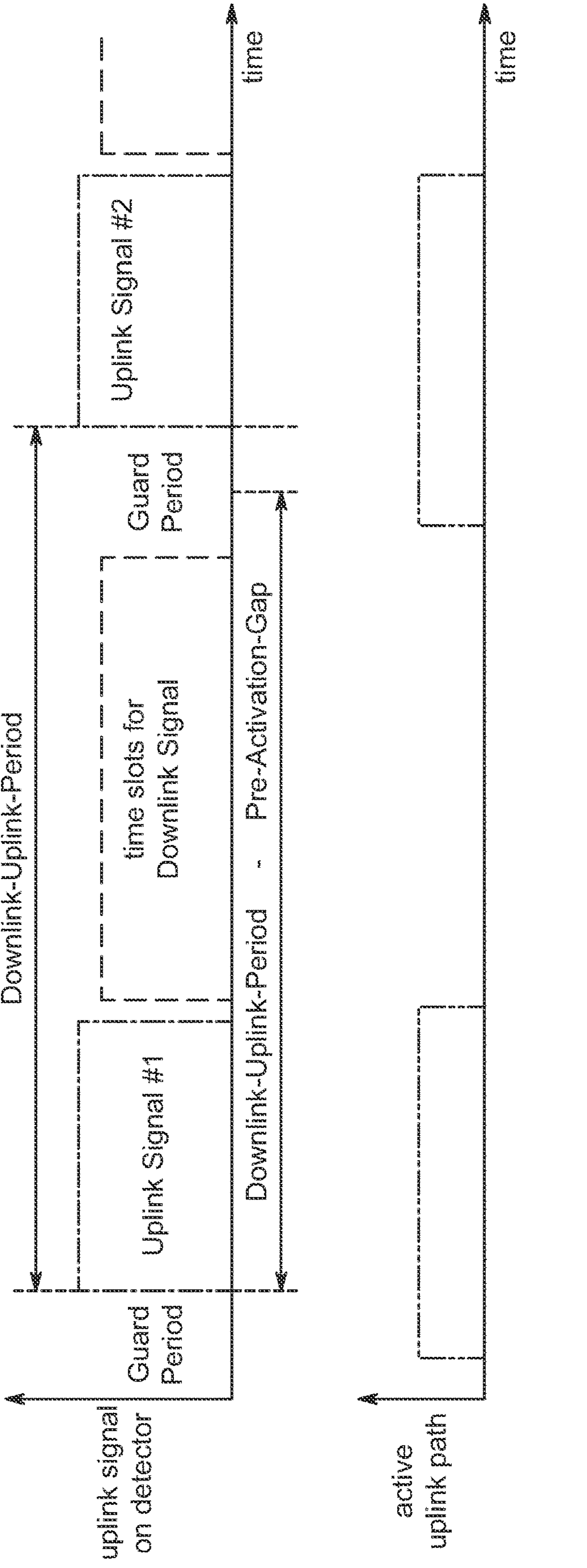
FIG. 8 includes upper and lower diagrams respectively showing detection of downlink/uplink path period and pre-activation of an uplink path according to exemplary embodiments of the present disclosure.

For example, FIG. 8 includes upper and lower diagrams respectively showing detection of downlink/uplink path period and pre-activation of an uplink path. The upper diagram shows the detected uplink signal from the mobile phone on a detector (e.g., TX detector 6*a* in FIG. 2, etc.) over time, e.g., for one radio frame. The lower diagram shows the moment when the power amplifier (e.g., transmission power amplifier 1 in FIG. 2, etc.) is activated.

Prediction and Uplink Path Activation Before Uplink Signal is Transmitted within Guard Period Before the uplink signal is transmitted, the transmission power amplifier (e.g., amplifier 1 in FIG. 2, etc.) in the uplink path is switched on and the reception amplifier (e.g., amplifier 2 in FIG. 2, etc.) in the downlink path is switched off. For example, the transmission power amplifier in the uplink path may be switched on and the reception amplifier in the downlink path may be switched off for a time period (e.g., about 10 μs, 20 μs, 30 μs, etc.) before the uplink signal is transmitted, which time period is not more than the duration of the Guard Period. It is generally preferred that the uplink path is activated in about the middle of the guard period.

Determine Length of Guard Period

The length of possible guard periods depends on the subcarrier spacing (SCS) respective OFDM symbol duration. Accordingly, the subcarrier spacing (SCS) respective OFDM symbol duration is necessary to define the correct switching point of the UL path.

Different approaches may be used to determine the subcarrier spacing (SCS) resp. OFDM symbol duration. For example, the subcarrier spacing (SCS) resp. OFDM symbol duration may be determined by a fixed relationship between cellular band and SCS, e.g., Band 41→15 kHz and Band 78→30 kHz. As another example, the subcarrier spacing (SCS) resp. OFDM symbol duration may be determined by a fixed relationship between period cycle and SCS, e.g., 2.5 ms→30 kHz and 5 ms/10 ms→15 kHz.

Or, for example, the subcarrier spacing (SC S) resp. OFDM symbol duration may be determined by measurement of OFDM symbol length directly perhaps on SRS symbol. As a further example, the subcarrier spacing (SCS) resp. OFDM symbol duration may be determined by detection of the DL and UL Signal and measurement of time between the DL and UL Transmission, where no signal is transmitted by base station or user equipment(s) 4 guard period.

In an additional example, the subcarrier spacing (SCS) resp. OFDM symbol duration may be determined by measurement/detection of the position of SRS symbols. In this latter example, the length of the guard period may be determined by measurement/detection of the SRS symbols. The measurement of SRS symbols may include measurement of deviation in UL period cycle. The beginning of an UL transmission can start a little earlier due to an SRS1 symbol and/or SRS2 symbol being is transmitted by the mobile phone or other terminal device or user equipment (UE).

Figure 9:
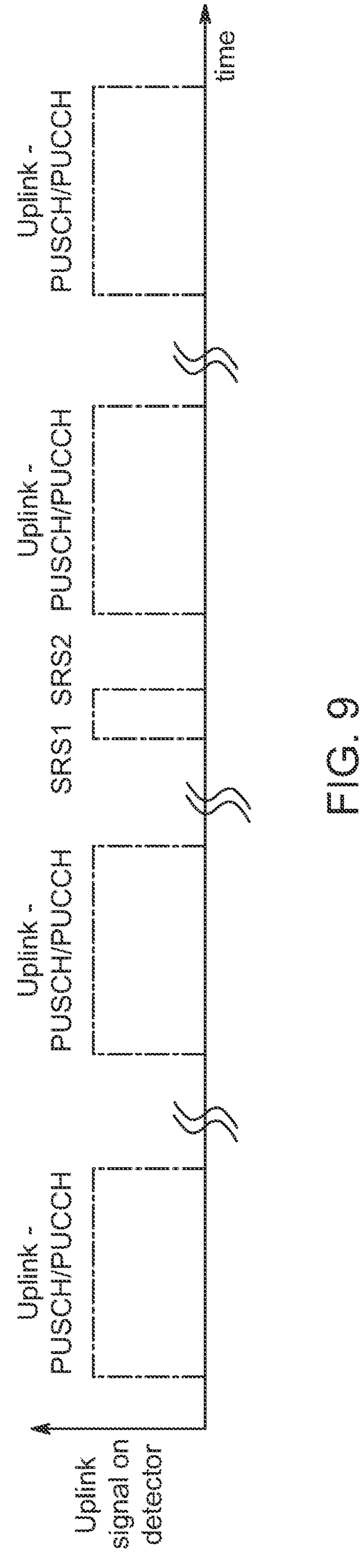
FIG. 9 shows detected uplink signals and time variation between uplink signals with and without SRS symbols.

FIG. 9 shows detected uplink signals and time variation between uplink signals with and without SRS symbols. The time variation between the detected starts of the mobile phone uplink signal is due to transmitted SRS(s). In FIG. 9, PUSCH refers to the Physical Uplink Shared Channel, and PUCCH refers to the Physical Uplink Control Channel. The Physical Uplink Shared Channel (PUSCH) carries user data. The Physical Uplink Control Channel (PUCCH) carries control information like: uplink control information (UCI), ACK/NACK information related to data packets received in the downlink, Channel quality indication (CQI), etc.

The third uplink signal has an additional SRS1 symbol before the uplink data is transmitted. A time analysis detects a transmitted SRS1 Symbol. It is possible to detect the OFDM symbol length to determine the minimum time of the guard period. When SRS1 is transmitted, the time position of the guard period in the radio frame structure may be estimated and predicted for the next guard period to activate the uplink path.

Based on the measured time gap, a transmitted SRS symbol may be identified, and the duration of an OFDM symbol may be estimated. Based on this information, the duration of the guard period before an uplink signal is transmitted can be determined. It can be assumed that the guard period will be at least the duration of one OFDM symbol.

Prediction Adaption Based on Analyzed Guard Period

Based on analyzed guard period, the activation time of the UL path (and hence the deactivation time of the DL path) can be defined within the guard period.

Figure 10:
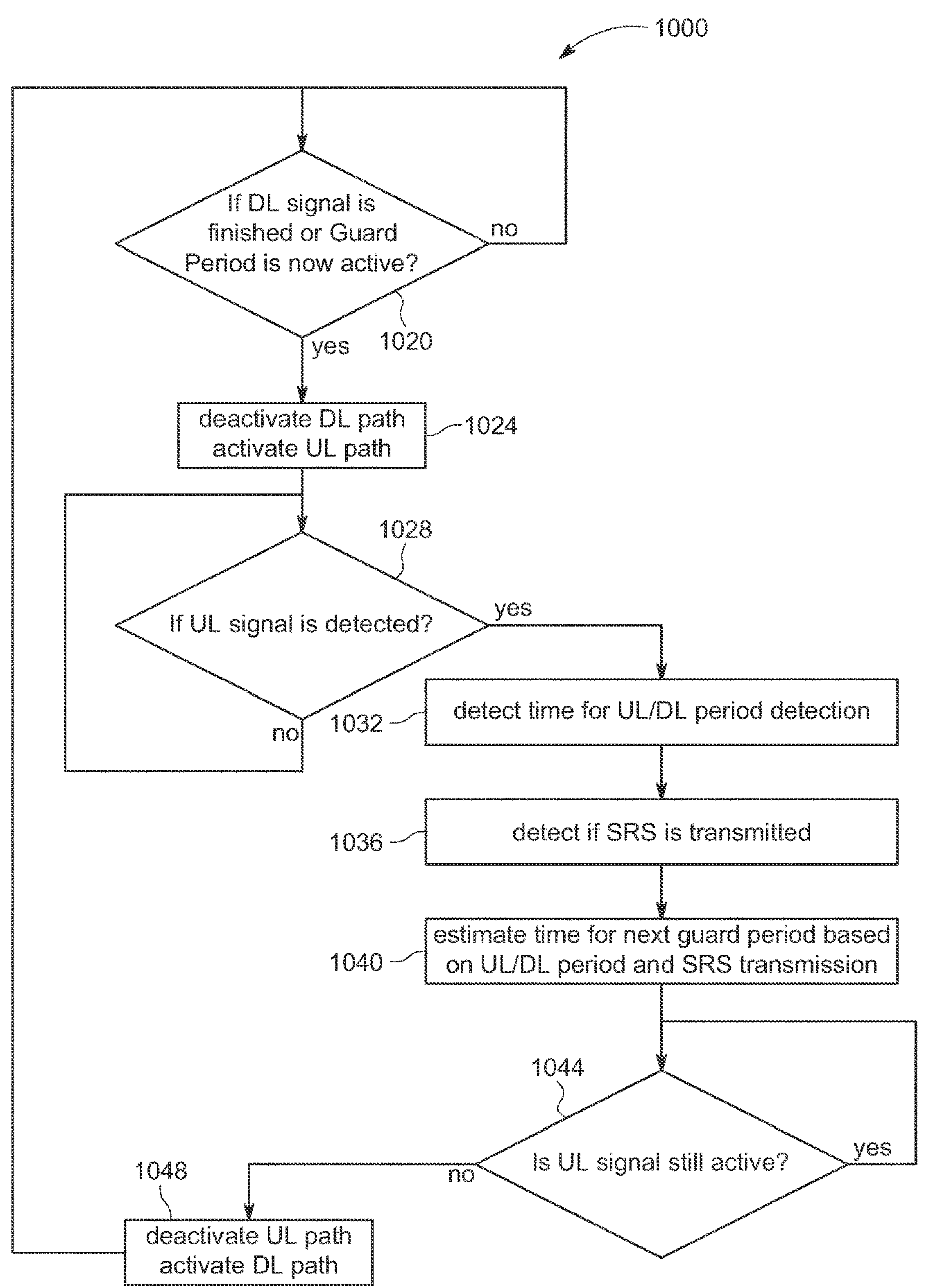
FIG. 10 is a flowchart of an example method for providing time division duplexing (TDD) synchronized compensation between a terminal device (e.g., mobile phone, user equipment within a vehicle, a coupling antenna on a wireless charger, etc.) and an antenna (e.g., a vehicle roof antenna, etc.) or antenna connection according to an exemplary embodiment of the present disclosure.

FIG. 10 illustrates an example method 1000 for providing time division duplexing (TDD) synchronized compensation between a terminal device (e.g., mobile phone, user equipment within a vehicle, a coupling antenna on a wireless charger, etc.) and an antenna (e.g., a vehicle roof antenna, etc.) or antenna connection according to an exemplary embodiment of the present disclosure.

As shown in FIG. 10, the method 1000 includes determining at 1020 if the downlink (DL) signal is finished or the guard period is now active. If it is determined at 1020 that the DL signal is finished or the guard period is now active, then the method proceeds to 1024 at which the DL path is deactivated and the uplink (UL) path is activated. At 1028, the control unit waits until the UL signal of a mobile phone or other terminal device is detected.

When the UL signal from the mobile phone is detected at 1028, the method 1000 proceeds to 1032 at which the time is detected for the UL/DL period detection. At 1036, the method 1000 includes detecting whether or not an SRS is transmitted. At 1040, the method 1000 includes estimating the time for the next guard period based on the UL/DL period from 1032 and the detected SRS transmission from 1040.

At 1044, the method 1000 includes determining if the UL signal is still active. If it is determined at 1044 that the UL signal is no longer active, then the method proceeds to 1048 at which the UL path is deactivated and the DL path is activated.

Accordingly, exemplary embodiments are disclosed of a circuit that comprises at least one detector, at least one control unit, at least one uplink path including at least one transmission amplifier, and at least one downlink path including at least one reception amplifier. The uplink and downlink paths are configured to be operable for respectively amplifying uplink and downlink signals having a same frequency according to time division duplexing (TDD). The control unit is configured to be operable for activating the uplink path and deactivating the downlink path before an uplink signal is transmitted by a terminal device In exemplary embodiments, the detector and the control unit are configured to be operable for: detecting a signal parameter of a TDD signal; and based on the detected TDD signal parameter, activating the uplink path and deactivating the downlink path before an uplink subframe is transmitted by the terminal device and after a downlink subframe is received from a base station. The detected TDD signal parameter may include at least one of a cellular standard, a cellular frequency band, and/or at least one parameter of a TDD frame format. The detected TDD signal parameter may comprise at least one parameter of a TDD frame format including at least one or more of: subcarrier spacing; an orthogonal frequency-division multiplexing symbol length; a time period cycle of uplink subframes; and/or a position and/or a length of sounding reference symbols.

In exemplary embodiments, the detector and the control unit are configured to be operable such that the switching point defined by the activation of the uplink path and the deactivation of the downlink path occurs in a guard period defined in a radio frame structure of a TDD signal. The detector and the control unit may be configured to be operable for adjusting the switching point if the guard period changes In exemplary embodiments, the detector and the control unit are configured to be operable such that the switching point defined by the activation of the at least one uplink path and the deactivation of the at least one downlink path occurs before sounding reference symbols are transmitted.

In exemplary embodiments, the detector and the control unit are configured to be operable for: analyzing a radio frame structure of a TDD signal including one or more of a transmission period, a duration, and/or an orthogonal frequency-division multiplexing symbol length, which said radio frame structure does not change during the transmission process; and synchronizing the switching of the uplink and downlink paths to the radio frame structure based on the analysis of the radio frame structure of the TDD signal. The detector and the control unit may be configured to be operable such that the downlink path is deactivated and the uplink path is activated within a guard period defined in the radio frame structure of the TDD signal. The detector and the control unit may also be configured to be operable for adjusting the switching point defined by the activation of the uplink path and the deactivation of the downlink path if the guard period changes. The detector and the control unit may be further configured to be operable such that the downlink path is deactivated and the uplink path is activated after the last downlink signal is received from the base station and before an uplink signal is transmitted from the terminal. Additionally, the detector and the control unit may be configured to be operable such that the downlink path is activated and the uplink path is deactivated after the last uplink signal is transmitted by the terminal and before a downlink signal is received from the base station. Further, the detector and the control unit may be configured to be operable such that the uplink path is activated sufficiently early to enable support for sound referencing symbols.

In exemplary embodiments, the detector and the control unit are configured to be operable for: analyzing a time period cycle of uplink frames of a radio frame structure of a TDD signal; predicting the beginning of the uplink frames based on the analysis of the time period cycle of the uplink frames; and pre-activating the uplink path before an uplink signal is transmitted from the terminal. The detector and the control unit may be configured to be operable for switching on the transmission amplifier in the uplink path and switching off the reception amplifier in the downlink path for at least a minimum time period before the uplink signal is transmitted. A guard period may be defined in the radio frame structure of the TDD signal. And the minimum time period may be not more than a duration of the guard period; and/or the uplink path may be activated in about the middle of the guard period.

In exemplary embodiments, the detector and the control unit are configured to determine a duration of a guard period defined in a radio frame structure of a TDD signal based on at least one of: a fixed relationship between cellular band and subcarrier spacing; a fixed relationship between period cycle and subcarrier spacing; measurement of orthogonal frequency-division multiplexing symbol length; measurement and/or detection of the position of sound referencing symbols; and detection of the uplink and downlink signals and measurement of time between the downlink and uplink transmissions. The absence of signal transmissions defines the guard period.

In exemplary embodiments, the TDD signal is a Long-Term Evolution, 4$^{th}$ mobile phone generation signal. Or the TDD signal is a New Radio, 5$^{th}$ mobile phone generation signal.

In exemplary embodiments, the detector and the control unit are configured to be operable for determining orthogonal frequency-division multiplexing symbol (OFDM-Symbol) length by length of detected sounding reference symbols (SRS symbols).

In exemplary embodiments, the at least one detector comprises at least two detectors configured to be operable for determining the signal direction of received uplink and downlink signals.

In exemplary embodiments, a compensator or signal amplifier device comprises a circuit as disclosed herein.

In exemplary embodiments, a vehicular communication system includes a circuit as disclosed herein. The vehicular communication system further includes at least one antenna configured to be operable for transmitting and receiving signals to/from a terminal device.

Also disclosed are exemplary methods of selectively amplifying uplink and downlink signals having a same frequency according to time division duplexing (TDD). In exemplary embodiments, the method comprises, before an uplink signal is transmitted by a terminal device: activating at least one uplink path including at least one transmission amplifier; and deactivating at least one downlink path including at least one reception amplifier.

In exemplary embodiments, the method includes: detecting a signal parameter of a TDD signal; and based on the detected TDD signal parameter, activating the uplink path and deactivating the downlink path before an uplink subframe is transmitted by the terminal device and after a downlink subframe is received from a base station. The detected TDD signal parameter may include at least one of a cellular standard, a cellular frequency band, and/or at least one parameter of a TDD frame format. The detected TDD signal parameter may comprise at least one parameter of a TDD frame format including at least one or more of: subcarrier spacing; an orthogonal frequency-division multiplexing symbol length; a time period cycle of uplink subframes; and/or a position and/or a length of sounding reference symbols.

In exemplary embodiments, the method includes activating the uplink path and deactivating the downlink path such that the switching point defined by the activation of the uplink path and the deactivation of the downlink path occurs in a guard period defined in a radio frame structure of a TDD signal. The method may also include adjusting the switching point if the guard period changes.

In exemplary embodiments, the method includes activating the uplink path and deactivating the downlink path such that the switching point defined by the activation of the uplink path and the deactivation of the downlink path occurs before sounding reference symbols are transmitted.

In exemplary embodiments, the method includes: analyzing a radio frame structure of a TDD signal including one or more of a transmission period, a duration, and/or an orthogonal frequency-division multiplexing symbol length, which said radio frame structure does not change during the transmission process; and synchronizing the switching of the uplink and downlink paths to the radio frame structure based on the analysis of the radio frame structure of the TDD signal. The method may also include activating the uplink path and deactivating the downlink path within a guard period defined in the radio frame structure of the TDD signal. The method may further include adjusting the switching point defined by the activation of the uplink path and the deactivation of the downlink path if the guard period changes. Additionally, the method may include activating the uplink path and deactivating the downlink path such that the downlink path is deactivated and the uplink path is activated after the last downlink signal is received from the base station and before an uplink signal is transmitted from the terminal. Further, the method may include activating the uplink path and deactivating the downlink path such that the downlink path is activated and the uplink path is deactivated after the last uplink signal is transmitted by the terminal and before a downlink signal is received from the base station. Also, the method may include activating the uplink path sufficiently early to enable support for sound referencing symbols.

In exemplary embodiments, the method includes: analyzing a time period cycle of uplink frames of a radio frame structure of a TDD signal; predicting the beginning of the uplink frames based on the analysis of the time period cycle of the uplink frames; and pre-activating the uplink path before an uplink signal is transmitted from the terminal. The method may also include switching on the transmission amplifier in the uplink path and switching off the reception amplifier in the downlink path for at least a minimum time period before the uplink signal is transmitted. A guard period may be defined in the radio frame structure of the TDD signal. And the minimum time period may be not more than a duration of the guard period; and/or the uplink path may be activated in about the middle of the guard period.

In exemplary embodiments, the method includes determining a duration of a guard period defined in a radio frame structure of a TDD signal based on at least one of: a fixed relationship between cellular band and subcarrier spacing; a fixed relationship between period cycle and subcarrier spacing; measurement of orthogonal frequency-division multiplexing symbol length; measurement and/or detection of the position of sound referencing symbols; and detection of the uplink and downlink signals and measurement of time between the downlink and uplink transmissions. The absence of signal transmissions defines the guard period.

In exemplary embodiments, the TDD signal is a Long-Term Evolution, 4$^{th}$ mobile phone generation signal; or the TDD signal is a New Radio, 5$^{th}$ mobile phone generation signal.

In exemplary embodiments, the method includes determining orthogonal frequency-division multiplexing symbol (OFDM-Symbol) length by length of detected sounding reference symbols (SRS symbols).

In exemplary embodiments, the method includes using at least two detectors for determining the signal direction of received uplink and downlink signals.

In exemplary embodiments, a compensator or signal amplifier device is configured to perform a method as disclosed herein.

In exemplary embodiments, a vehicular communication system includes a circuit configured to perform a method as disclosed herein. The vehicular communication system further includes at least one antenna configured to be operable for transmitting and receiving signals to/from a terminal device.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A circuit comprising:
at least one detector;
at least one control unit;
at least one uplink path including at least one transmission amplifier; and
at least one downlink path including at least one reception amplifier; wherein:
the uplink and downlink paths are configured to be operable for respectively amplifying uplink and downlink signals having a same frequency according to time division duplexing (TDD);
the control unit is configured to be operable for activating the uplink path and deactivating the downlink path before an uplink signal is transmitted by a terminal device; and
the detector and the control unit are configured to be operable for:
analyzing a radio frame structure of a TDD signal including one or more of a transmission period, a duration, and/or an orthogonal frequency-division multiplexing symbol length, which said radio frame structure does not change during a transmission process; and
synchronizing the switching of the uplink and downlink paths to the radio frame structure based on the analysis of the radio frame structure of the TDD signal.

2. The circuit of claim 1, wherein the detector and the control unit are configured to be operable for:
detecting a signal parameter of a TDD signal; and
based on the detected TDD signal parameter, activating the uplink path and deactivating the downlink path before an uplink subframe is transmitted by the terminal device and after a downlink subframe is received from a base station.

3. The circuit of claim 2, wherein the detected TDD signal parameter includes at least one of a cellular standard, a cellular frequency band, and/or at least one parameter of a TDD frame format.

4. The circuit of claim 2, wherein the detected TDD signal parameter comprises at least one parameter of a TDD frame format including at least one or more of:
subcarrier spacing;
an orthogonal frequency-division multiplexing symbol length;
a time period cycle of uplink subframes; and/or
a position and/or a length of sounding reference symbols.

5. The circuit of claim 1, wherein the detector and the control unit are configured to be operable such that the switching point defined by the activation of the uplink path and the deactivation of the downlink path occurs in a guard period defined in a radio frame structure of a TDD signal.

6. The circuit of claim 5, wherein the detector and the control unit are configured to be operable for adjusting the switching point if the guard period changes.

7. The circuit of claim 1, wherein the detector and the control unit are configured to be operable such that the switching point defined by the activation of the at least one uplink path and the deactivation of the at least one downlink path occurs before sounding reference symbols are transmitted.

8. The circuit of claim 1, wherein the detector and the control unit are configured to be operable such that the downlink path is deactivated and the uplink path is activated within a guard period defined in the radio frame structure of the TDD signal.

9. The circuit of claim 8, wherein the detector and the control unit are configured to be operable for adjusting the switching point defined by the activation of the uplink path and the deactivation of the downlink path if the guard period changes.

10. The circuit of claim 1, wherein the detector and the control unit are configured to be operable such that the downlink path is deactivated and the uplink path is activated after the last downlink signal is received from the base station and before an uplink signal is transmitted from the terminal.

11. The circuit of claim 1, wherein the detector and the control unit are configured to be operable such that the downlink path is activated and the uplink path is deactivated after the last uplink signal is transmitted by the terminal and before a downlink signal is received from the base station.

12. The circuit of claim 1, wherein the detector and the control unit are configured to be operable such that the uplink path is activated sufficiently early to enable support for sound referencing symbols.

13. The circuit of claim 1, wherein the detector and the control unit are configured to be operable for:

analyzing a time period cycle of uplink frames of a radio frame structure of a TDD signal;

predicting the beginning of the uplink frames based on the analysis of the time period cycle of the uplink frames; and pre-activating the uplink path before an uplink signal is transmitted from the terminal.

14. The circuit of claim 13, wherein the detector and the control unit are configured to be operable for switching on the transmission amplifier in the uplink path and switching off the reception amplifier in the downlink path for at least a minimum time period before the uplink signal is transmitted.

15. The circuit of claim 14, wherein a guard period is defined in the radio frame structure of the TDD signal, and wherein:

the minimum time period is not more than a duration of the guard period; and/or the uplink path is activated in about the middle of the guard period.

16. The circuit of claim 1, wherein the detector and the control unit are configured to determine a duration of a guard period defined in a radio frame structure of a TDD signal based on at least one of:

a fixed relationship between cellular band and subcarrier spacing; a fixed relationship between period cycle and subcarrier spacing;

measurement of orthogonal frequency-division multiplexing symbol length; measurement and/or detection of the position of sound referencing symbols; and detection of the uplink and downlink signals and measurement of time between the downlink and uplink transmissions, whereby the absence of signal transmissions defines the guard period.

17. The circuit of claim 1, wherein the detector and the control unit are configured to be operable for determining orthogonal frequency-division multiplexing symbol (OFDM-Symbol) length by length of detected sounding reference symbols (SRS symbols).

18. The circuit of claim 1, wherein:

the at least one detector comprises at least two detectors configured to be operable for determining the signal direction of received uplink and downlink signals; and/or the TDD signal is a Long-Term Evolution, 4th mobile phone generation signal or a New Radio, 5th mobile phone generation signal.

19. A method of selectively amplifying uplink and downlink signals having a same frequency according to time division duplexing (TDD), the method comprises, before an uplink signal is transmitted by a terminal device:

activating at least one uplink path including at least one transmission amplifier;

deactivating at least one downlink path including at least one reception amplifier;

analyzing a radio frame structure of a TDD signal including one or more of a transmission period, a duration, and/or an orthogonal frequency-division multiplexing symbol length, which said radio frame structure does not change during a transmission process; and synchronizing the switching of the uplink and downlink paths to the radio frame structure based on the analysis of the radio frame structure of the TDD signal.

20. The method of claim 19, wherein the method includes:

detecting a signal parameter of a TDD signal comprising at least one parameter of a TDD frame format including at least one or more of subcarrier spacing, an orthogonal frequency-division multiplexing symbol length, a time period cycle of uplink subframes, and/or a position and/or a length of sounding reference symbols; and based on the detected TDD signal parameter, activating the uplink path and deactivating the downlink path before an uplink subframe is transmitted by the terminal device and after a downlink subframe is received from a base station.

21. The method of claim 19, wherein the method includes:

activating the uplink path and deactivating the downlink path such that the switching point defined by the activation of the uplink path and the deactivation of the downlink path occurs in a guard period defined in a radio frame structure of a TDD signal; and/or activating the uplink path and deactivating the downlink path such that the switching point defined by the activation of the uplink path and the deactivation of the downlink path occurs before sounding reference symbols are transmitted.

22. The method of claim 19, wherein the method includes:

analyzing a time period cycle of uplink frames of a radio frame structure of a TDD signal;

predicting the beginning of the uplink frames based on the analysis of the time period cycle of the uplink frames; and pre-activating the uplink path before an uplink signal is transmitted from the terminal.

23. The method of claim 19, wherein the method includes determining a duration of a guard period defined in a radio frame structure of a TDD signal based on at least one of:

a fixed relationship between cellular band and subcarrier spacing; a fixed relationship between period cycle and subcarrier spacing;

measurement of orthogonal frequency-division multiplexing symbol length;

measurement and/or detection of the position of sound referencing symbols; and detection of the uplink and downlink signals and measurement of time between the downlink and uplink transmissions, whereby the absence of signal transmissions defines the guard period.

* * * * *